United States Patent
Yoshizawa et al.

(10) Patent No.: US 8,368,274 B2
(45) Date of Patent: Feb. 5, 2013

(54) DYNAMOELECTRIC MACHINE AND METHOD FOR MANUFACTURING A ROTOR THEREFOR

(75) Inventors: Toshiyuki Yoshizawa, Tokyo (JP); Masaya Inoue, Tokyo (JP); Ryuichi Shimomura, Tokyo (JP); Takuma Wada, Tokyo (JP); Kanji Shinkawa, Tokyo (JP); Masao Morita, Tokyo (JP); Yoshiharu Hayashi, Tokyo (JP); Kazuya Nakamachi, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 103 days.

(21) Appl. No.: 13/122,611

(22) PCT Filed: Nov. 10, 2008

(86) PCT No.: PCT/JP2008/070385
§ 371 (c)(1),
(2), (4) Date: Apr. 5, 2011

(87) PCT Pub. No.: WO2010/052794
PCT Pub. Date: May 14, 2010

(65) Prior Publication Data
US 2011/0181142 A1    Jul. 28, 2011

(51) Int. Cl.
H02K 1/28        (2006.01)
H02K 21/14       (2006.01)
(52) U.S. Cl. ............... 310/156.72; 310/156.66; 310/263
(58) Field of Classification Search .......... 310/156.66–156.73, 263
See application file for complete search history.

(56) References Cited

U.S. PATENT DOCUMENTS

| 5,543,676 A | 8/1996 | York et al. |
| 7,560,851 B2 | 7/2009 | Inoue et al. |
| 7,569,968 B2 * | 8/2009 | Nakamura .................... 310/263 |
| 7,605,519 B2 | 10/2009 | Morita et al. |

(Continued)

FOREIGN PATENT DOCUMENTS

| CN | 101946389 A | 1/2011 |
| JP | 2002 136004 | 5/2002 |

(Continued)

OTHER PUBLICATIONS

International Search Report issued Jan. 13, 2009 in PCT/JP08/070385 filed Nov. 10, 2008.

*Primary Examiner* — Burton Mullins
(74) *Attorney, Agent, or Firm* — Oblon, Spivak, McClelland, Maier & Neustadt, L.L.P.

(57) ABSTRACT

Dynamoelectric machine having holding grooves recessed into yoke portions with openings on respective facing portions of inner wall surfaces of trough portions, at axially inner ends of the yoke portions, having axial groove directions, and an end surface in a groove length direction constitutes a stopping surface. Magnet material holders are disposed spanning the trough portions radially inside inner circumferential surfaces near tip ends of claw-shaped magnetic pole portions, fitted from axially inside into each holding groove, are recessed to face each other on the trough portions restricting circumferential and radial motion by inner wall surfaces of the holding grooves and axially outward movement restricted by the stopping surface. Interfitting grooves having openings on surfaces facing the inner circumferential surfaces near the tip ends, having axial groove directions, and passing through in the axial direction, and permanent magnets fitted into the interfitting grooves are held by the magnet material holders.

13 Claims, 10 Drawing Sheets

U.S. PATENT DOCUMENTS

| | | |
|---|---|---|
| 7,642,691 B2 * | 1/2010 | Morita et al. ............ 310/263 |
| 7,656,069 B2 | 2/2010 | Shinkawa et al. |
| 7,843,107 B2 | 11/2010 | Inoue et al. |
| 2002/0135265 A1 | 9/2002 | Umeda |
| 2004/0113512 A1 | 6/2004 | Maeda et al. |
| 2005/0269897 A1 | 12/2005 | Maeda et al. |
| 2010/0164317 A1 | 7/2010 | Inoue et al. |
| 2010/0207476 A1 | 8/2010 | Yoshizawa et al. |
| 2011/0001374 A1 | 1/2011 | Inoue et al. |
| 2011/0012449 A1 | 1/2011 | Hazeyama et al. |
| 2011/0043068 A1 | 2/2011 | Yoshizawa et al. |
| 2011/0148232 A1 | 6/2011 | Mori et al. |

FOREIGN PATENT DOCUMENTS

| | | |
|---|---|---|
| JP | 2004 194442 | 7/2004 |
| WO | 2008 044347 | 4/2008 |

* cited by examiner

DYNAMOELECTRIC MACHINE AND METHOD FOR MANUFACTURING A ROTOR THEREFOR

TECHNICAL FIELD

The present invention relates to a dynamoelectric machine such as an automotive alternator, etc., and a method for manufacturing a rotor therefor, and particularly relates to a permanent magnet holding construction for a Lundell rotor to which permanent magnets are mounted.

BACKGROUND ART

Loads from electrical equipment that is mounted due to environmental issues have been increasing rapidly in recent years, and further increases in generated power are being sought from Lundell rotors. If attempts are made to answer these demands within the scope of conventional design, the alternators are invariably increased in size, which is undesirable since the weight of and space occupied by such alternators is increased. Increases in alternator size are also known to give rise to new problems such as increased rotor inertia, and engine speed fluctuations and alternator inertial torque interacting and generating belt vibration and slippage. Because of these facts, there is demand to increase alternator capacity, that is, reducing alternator size and increasing output, without increasing alternator main body size.

In consideration of these conditions, first conventional alternators have been proposed in which permanent magnets are disposed between circumferentially adjacent claw-shaped magnetic pole portions of a Lundell rotor (see Patent Literature 1, for example).

Second conventional alternators have also been proposed in which permanent magnets are disposed on mounting faces of peripheral edges of magnetic pole pieces (corresponding to yoke portions) that are positioned between magnetic pole fingers (corresponding to claw-shaped magnetic pole portions), and straps are disposed so as to cover the permanent magnets and are fixed to the magnetic pole pieces by nails (see Patent Literature 2, for example).

Patent Literature 1: Japanese Patent Laid-Open No. SHO 61-85045 (Gazette)

Patent Literature 2: Japanese Patent Laid-Open No. 2004-153994 (Gazette)

DISCLOSURE OF THE INVENTION

Problem to be Solved by the Invention

Automotive alternators are driven by torque that is transmitted from an engine by means of belts and pulleys and rotate at high speeds in a vicinity of approximately 18,000 to 20,000 rpm. Because of this, even if small magnets that weight only a few grams per pole are installed, extremely large centrifugal forces that exceed several tens of kilogram force act on the magnets.

Large centrifugal forces also act on the claw-shaped magnetic pole portions even when not holding permanent magnets, and the tip portions thereof expand approximately 50 to 100 µm radially outward. Thus, the claw-shaped magnetic pole portions are displaced so as to flap with increases and decreases in engine rotational speed. Since the claw-shaped magnetic pole portions have a cantilevered supporting construction, displacement is greater near tip portions, and smaller near root portions, and relative distances between circumferentially adjacent claw-shaped magnetic pole portions also change.

Now, in the first conventional alternators in which the permanent magnets are disposed between the circumferentially adjacent claw-shaped magnetic pole portions, displacement of the claw-shaped magnetic pole portions due to centrifugal forces acts on the magnet holding construction in addition to the centrifugal forces, and one problem is that the permanent magnets cannot be held stably for a long time.

In the second conventional alternators, because the permanent magnets are disposed between the claw-shaped magnetic pole portions of the yoke portions, displacement of the claw-shaped magnetic pole portions due to centrifugal force does not act on the magnet holding construction. However, because the straps that hold the permanent magnets are fixed to the yoke portions by nails, stresses that act on the magnet holding construction due to centrifugal force are concentrated at the fastening points between the straps and the yoke portions by the nails, facilitating the occurrence of damage to the fastening portions. Because the nails are driven into the axial end surfaces of the yoke portions from axial directions, if axial forces act through the permanent magnets and the straps in a direction that pulls the nails out, the fastening forces from the nails on the straps are reduced. In addition, because the straps are disposed so as to cover two axial end surfaces and radially outer surfaces of the permanent magnets that have been disposed on the mounting surfaces radially outside the yoke portions, and two ends thereof are fixed to two axial end surfaces of the magnetic pole pieces by the nails, fixing of the permanent magnets against circumferential movement is insufficient. Thus, one problem in the magnet holding construction according to second conventional alternators is that the permanent magnets cannot be held stably for a long time.

The present invention aims to solve the above problems and an object of the present invention is to provide a dynamoelectric machine, and a method for manufacturing a rotor therefor, that can hold permanent magnets stably for a long time by a simple magnet holding construction, by holding the permanent magnets in magnet holders that are made of a magnetic material that are fitted into trough portions between claw-shaped magnetic pole portions of yoke portions to eliminate influence of displacement of the claw-shaped magnetic pole portions due to centrifugal forces and bear the centrifugal forces that act on the permanent magnets and the magnet holder on interfitting surfaces.

Means for Solving the Problem

In order to achieve the above object, according to one aspect of the present invention, there is provided a dynamoelectric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, a trough portion that curves radially inward being formed on a portion of each of the yoke portions between circumferentially adjacent claw-shaped magnetic pole portions, and the pole core being fixed to a rotating shaft that is inserted through a central axial position of the boss portion; and a field coil that is wound onto a bobbin, and that is housed inside a space that is surrounded by the boss portion, the pair of yoke portions, and the plurality of claw-shaped magnetic pole portions; and a stator that is disposed so as to surround an outer circumference of the rotor so as to have a predetermined air gap interposed. The dynamoelectric machine includes: holding grooves that are recessed into the yoke portions in a non-piercing state so as to have openings on respective facing portions of inner wall surfaces of the trough portions, so as to have openings at axially inner ends of the yoke portions, and so as to have groove directions in an axial direction, and in which an end surface in a groove length direction constitutes a stopping surface; and magnet holders that are made of a magnetic material that are disposed so as to span the trough portions radially inside inner circumferential surfaces near tip ends of the claw-shaped magnetic pole portions by being fitted from axially inside into each of the holding grooves that are recessed so as to face each other on the trough portions such that circumferential and radial motion is restricted by inner wall surfaces of the holding grooves and axially outward movement is restricted by the stopping surface, and in which interfitting grooves are formed so as to have openings on surfaces that face the inner circumferential surfaces near the tip ends of the claw-shaped magnetic pole portions, so as to have groove directions in an axial direction, and so as to pass through in the axial direction. Permanent magnets are fitted into the interfitting grooves and are held by the magnet holders so as to face the inner circumferential surfaces near the tip ends of the claw-shaped magnetic pole portions.

Effects of the Invention

According to the present invention, because permanent magnets are held by magnet holders that are disposed so as to span trough portions that are formed on portions of yoke portions between circumferentially adjacent claw-shaped magnetic pole portions, displacement of the claw-shaped magnetic pole portions due to centrifugal forces does not affect the magnet holding construction. Because the magnet holders are fitted into and held by holding grooves that are recessed into the trough portions, centrifugal forces that act on the permanent magnets and the magnet holders are borne by interfitting surfaces of the holding grooves, enabling concentrations of stress at the interfitting portions to be alleviated. Because the permanent magnets are fitted into and held by interfitting grooves that are formed on the magnet holders, centrifugal forces that act on the permanent magnets are borne by interfitting surfaces of the interfitting grooves, enabling concentrations of stress at the interfitting portions to be alleviated. In addition, circumferential and radial motion of the magnet holders is restricted by inner wall surfaces of the holding grooves, and axially outward movement is restricted by the stopping surfaces of the holding grooves. Consequently, the permanent magnets can be held stably for a long time by a simple magnet holding construction.

BEST MODE FOR CARRYING OUT THE INVENTION

Embodiment 1

Figure 1:
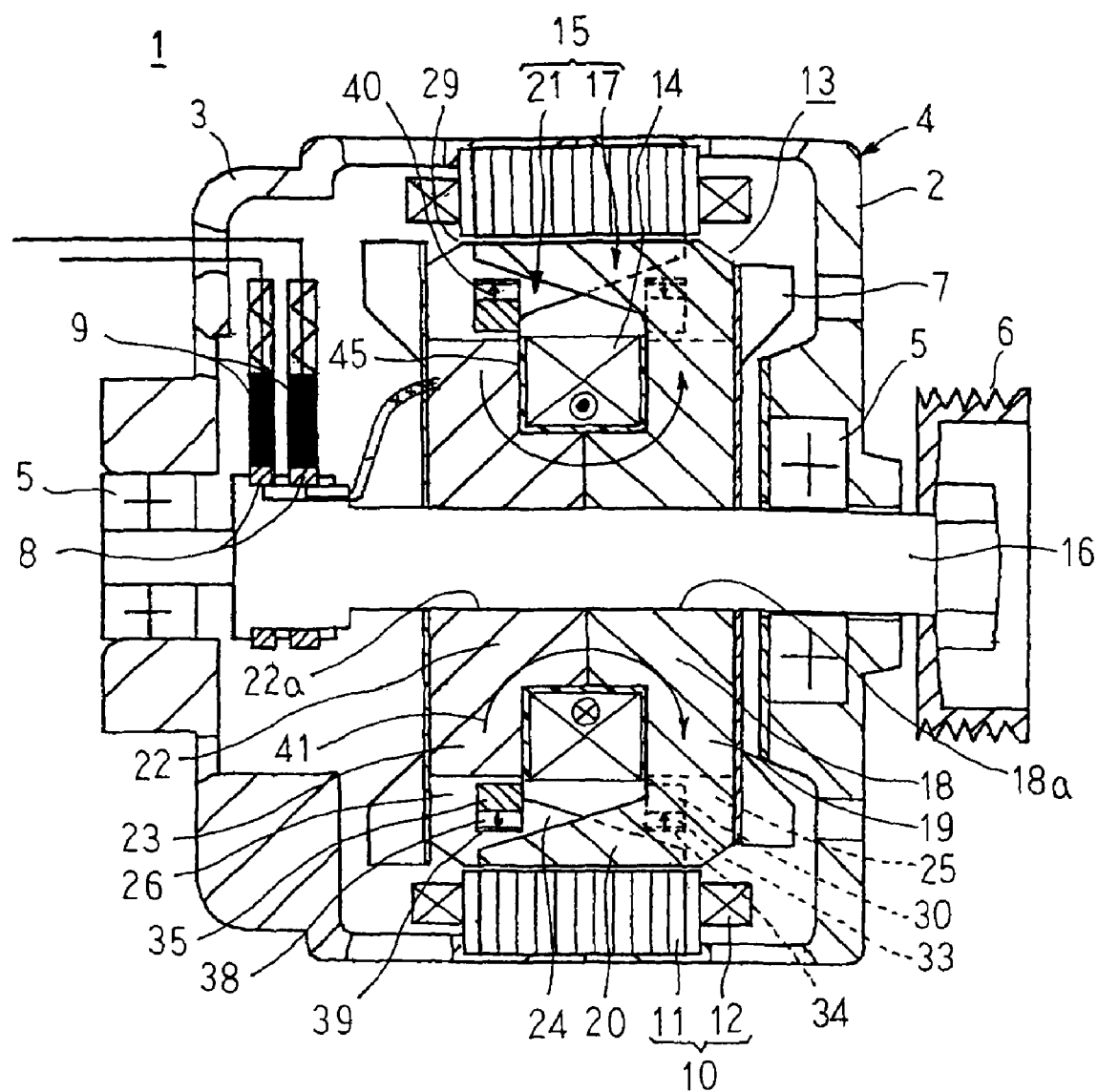
FIG. 1 is a cross section that schematically shows an automotive alternator according to Embodiment 1 of the present invention.
Figure 2:
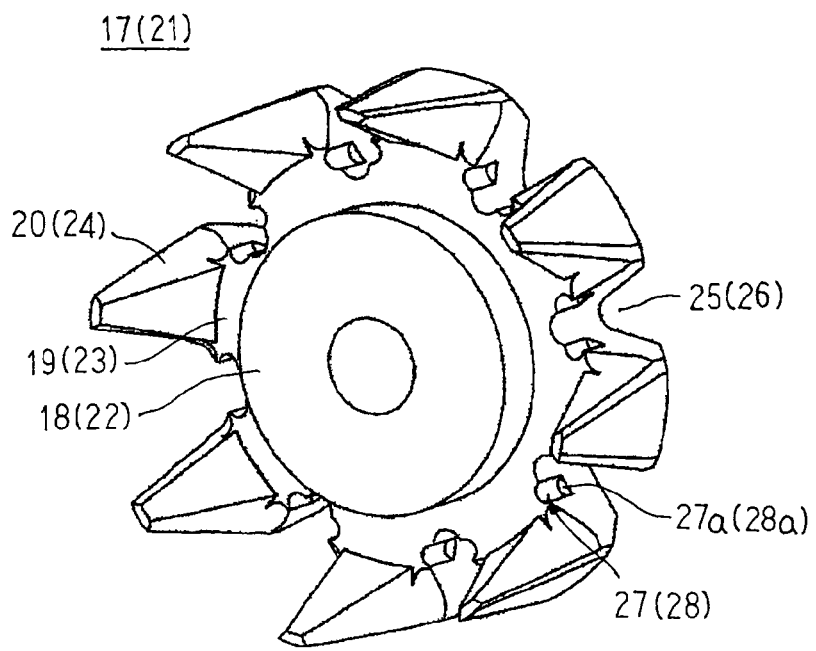
FIG. 2 is a perspective that shows a pole core body that constitutes a rotor that can be used in the automotive alternator according to Embodiment 1 of the present invention.
Figure 3:
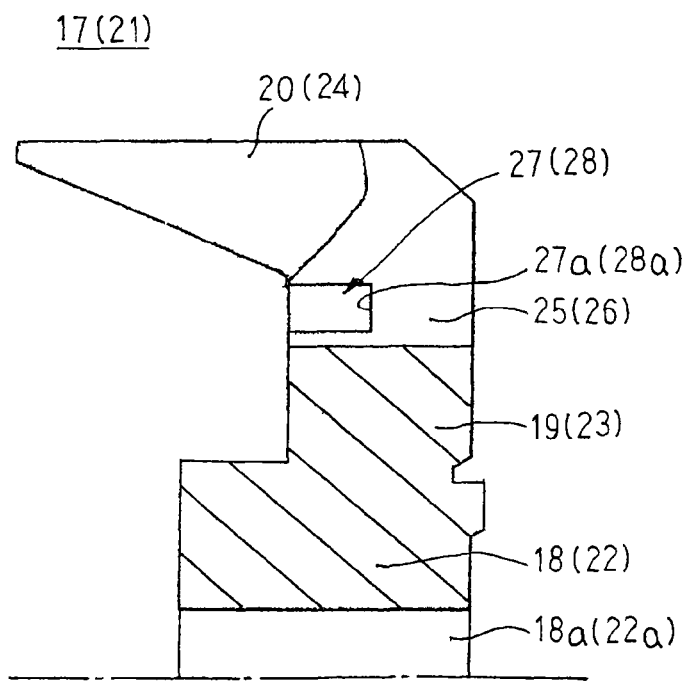
FIG. 3 is a partial cross section that shows a pole core body that constitutes the rotor that can be used in the automotive alternator according to Embodiment 1 of the present invention.
Figure 4:
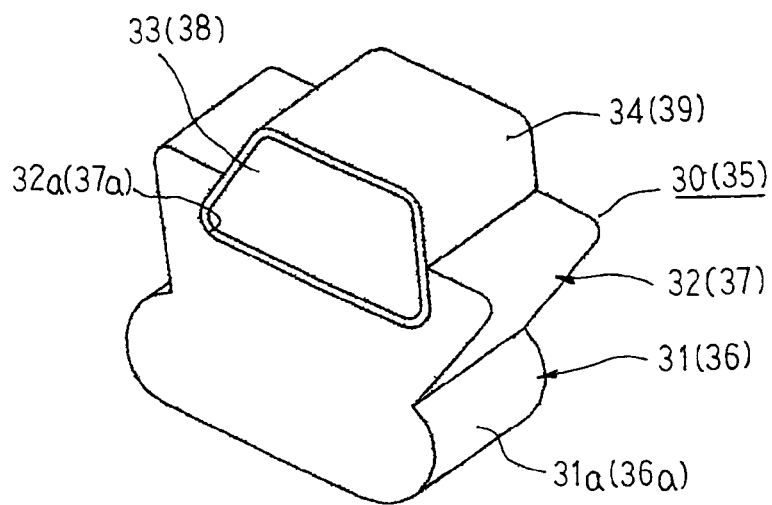
FIG. 4 is a perspective that shows a state in which a permanent magnet is mounted to a magnet holder in the automotive alternator according to Embodiment 1 of the present invention.
Figure 5:
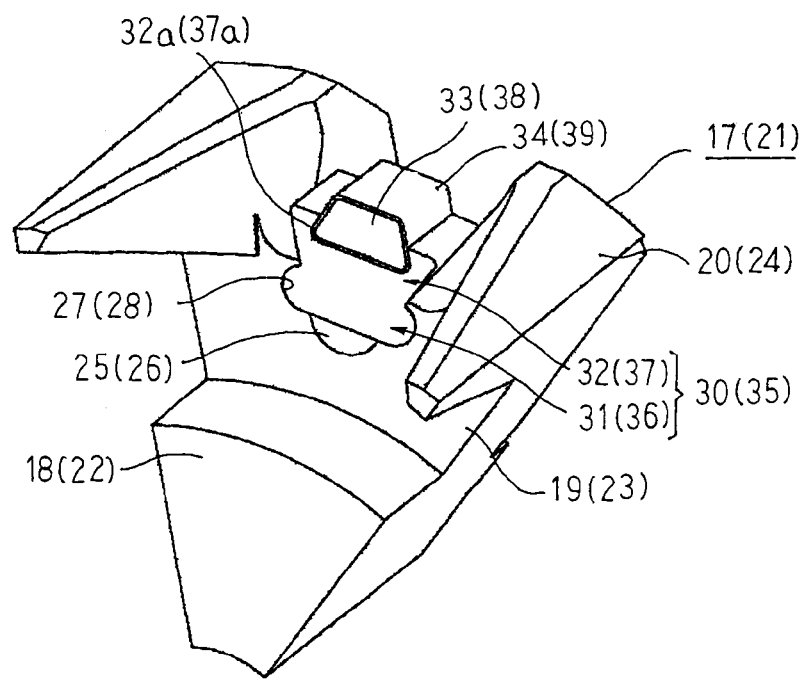
FIG. 5 is a partial perspective that shows a state in which the permanent magnet is mounted to the pole core body in the automotive alternator according to Embodiment 1 of the present invention.
Figure 6:
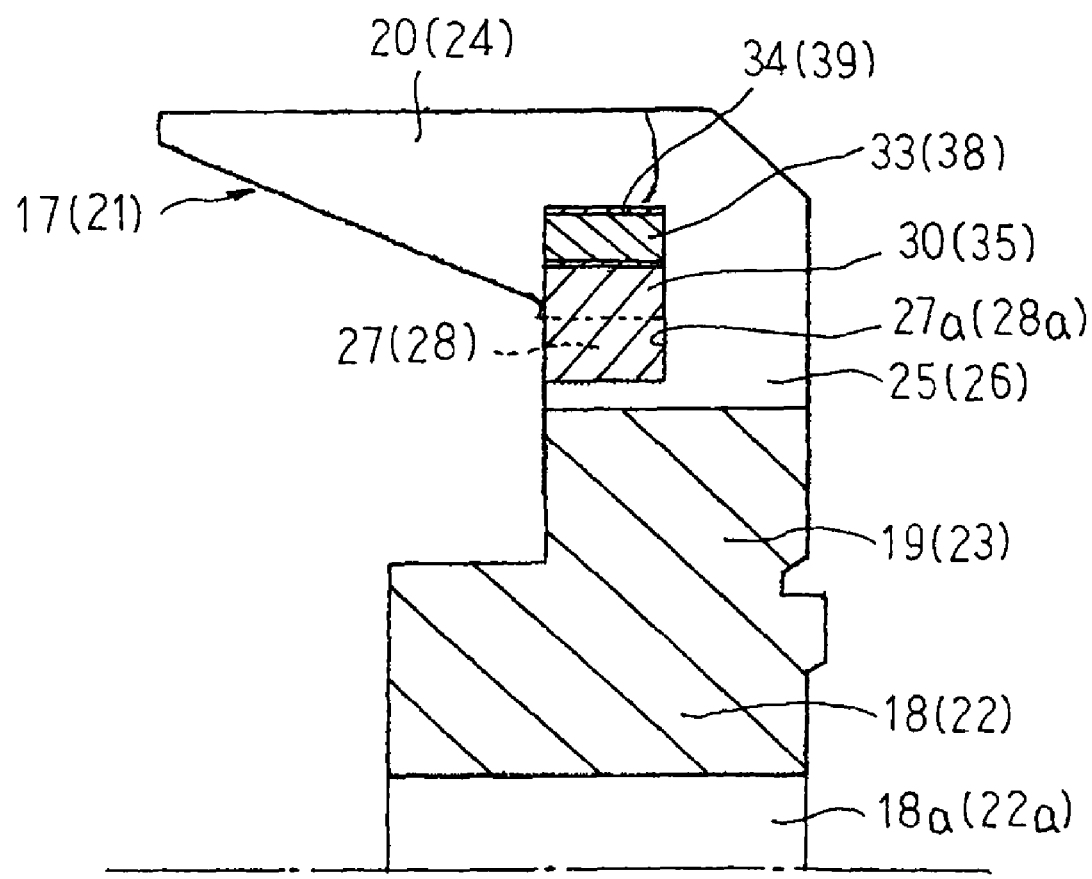
FIG. 6 is a partial cross section that shows the state in which the permanent magnet is mounted to the pole core body in the automotive alternator according to Embodiment 1 of the present invention.

FIG. 1 is a cross section that schematically shows an automotive alternator according to Embodiment 1 of the present invention, FIG. 2 is a perspective that shows a pole core body that constitutes a rotor that can be used in the automotive alternator according to Embodiment 1 of the present invention, FIG. 3 is a partial cross section that shows a pole core body that constitutes the rotor that can be used in the automotive alternator according to Embodiment 1 of the present invention, FIG. 4 is a perspective that shows a state in which a permanent magnet is mounted to a magnet holder in the automotive alternator according to Embodiment 1 of the present invention, FIG. 5 is a partial perspective that shows a state in which the permanent magnet is mounted to the pole core body in the automotive alternator according to Embodiment 1 of the present invention, and FIG. 6 is a partial cross section that shows the state in which the permanent magnet is mounted to the pole core body in the automotive alternator according to Embodiment 1 of the present invention.

In FIGS. 1 through 6, an automotive alternator 1 includes: a case 4 that is constituted by a front bracket 2 and a rear bracket 3 that are each made of aluminum in an approximate cup shape; a rotor 13 that is rotatably disposed inside the case 4 such that a rotating shaft 16 is supported by means of bearings 5 in the case 4; a pulley 6 that is fixed to an end portion of the rotating shaft 16 that projects outward at a front end of the case 4; fans 7 that are fixed to two end surfaces of the rotor 13 in an axial direction of the rotor 13 (hereinafter called "the axial direction"); a stator 10 that is fixed to the case 4 so as to surround an outer circumference of the rotor 13 so as to have a constant air gap 29 relative to the rotor 13; a pair of slip rings 8 that are fixed to a rear end of the rotating shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the rotating shaft 16, which is fitted through a central axial position of the pole core 15.

Here, the bobbin 45 is prepared using a resin such as nylon 66, etc., and is constituted by: a cylindrical drum portion 45a; and annular flange portions 45b that are disposed so as to extend radially outward from two axial ends of the drum portion 45a. The field coil 14 is configured by winding a coil wire onto the drum portion 45a.

The pole core 15 is configured so as to be divided into first and second pole core bodies 17 and 21 that are each prepared by a cold forging method using a low carbon steel such as S10C, for example.

The first pole core body 17 has: a first boss portion 18 that has an outer circumferential surface that has a cylindrical shape, and in which a rotating shaft insertion aperture 18a is formed so as to pass through a central axial position; a thick ring-shaped first yoke portion 19 that is disposed so as to extend radially outward from a first axial end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially. In addition, first trough portions 25 are recessed so as to have U shapes that curve concavely toward a radially-inner side, for example, at portions that are positioned between respective adjacent first claw-shaped magnetic pole portions 20 of the first yoke portion 19.

The second pole core body 21 has: a second boss portion 22 that has an outer circumferential surface that has a cylindrical shape, and in which a rotating shaft insertion aperture 22a is formed so as to pass through a central axial position; a thick ring-shaped second yoke portion 23 that is disposed so as to extend radially outward from a second axial end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially. In addition, second trough portions 26 are recessed into U shapes that curve concavely toward a radially-inner side, for example, at portions that are positioned between respective adjacent second claw-shaped magnetic pole portions 24 of the second yoke portion 23.

First holding grooves 27 are recessed to a predetermined groove length from a second end of the first yoke portion 19 toward a first end near roots of the respective first claw-shaped magnetic pole portions 20 of the first pole core body 17 so as to have openings at respective facing portions radially outside inner walls surfaces of the respective first trough portions 25 and so as to have groove directions in the axial direction. Thus, first ends of the first holding grooves 27 are closed to form first stopping surfaces 27a. Similarly, second holding grooves 28 are recessed to a predetermined groove length from the first end of the second yoke portion 23 toward the second end near roots of respective second claw-shaped magnetic pole portions 24 of the second pole core body 21 so as to have openings at respective facing portions radially outside inner walls surfaces of the respective second trough portions 26 and so as to have groove directions in the axial direction. Thus, second ends of the second holding grooves 28 are closed to form second stopping surfaces 28a. Here, the first and second holding grooves 27 and 28 are formed so as to have groove shapes that have semicircular cross sections.

First and second pole core bodies 17 and 21 that are configured in this manner are fixed to the rotating shaft 16 that has been fitted through the rotating shaft insertion apertures 18a and 22a such that the first and second claw-shaped magnetic pole portions 20 and 24 alternately intermesh and a second end surface of the first boss portion 18 is abutted to a first end surface of the second boss portion 22. Here, the bobbin 45 is mounted such that the drum portion 45a is fitted over the first and second boss portions 18 and 22, and axially outer end surfaces of the flange portions 45b are placed in close contact with axially inner end surfaces of the first yoke portions 19 and 23. The field coil 14 is thereby mounted in a space that is surrounded by the first and second boss portions 18 and 22, the first and second yoke portions 19 and 23, and the first and second claw-shaped magnetic pole portions 20 and 24.

Here, the first and second boss portions 18 and 22 and the first and second yoke portions 19 and 23 correspond to a boss portion and a pair of yoke portions of the pole core 15. The second end surface of the first boss portion 18 and the first end surface of the second boss portion 22 that have been abutted constitute a dividing surface of the pole core 15. Furthermore, tip end portions of the first and second claw-shaped magnetic pole portions 20 and 24 overlap with the second and first yoke portions 23 and 19, respectively, in the axial direction.

First magnet holders 30 have: first interfitting portions 31; and first magnet holding portions 32 that are formed integrally on upper portions of the first interfitting portions 31 are prepared so as to have a similar thickness to the groove length of the first holding grooves 27 using a magnetic material such as iron, a ferromagnetic alloy, etc. Thus, first interfitting protruding portions 31*a* that have external shapes that can be fitted together with the first holding grooves 27 are disposed so as to project from two side portions of the first interfitting portions 31. In addition, first interfitting grooves 32*a* have groove directions in a thickness direction, and are recessed so as to have openings on upper surfaces of the first magnet holding portions 32. Groove widths of the first interfitting grooves 32*a* become gradually narrower toward the openings.

First permanent magnets 33 are prepared so as to have external shapes that conform to internal shapes of the first interfitting grooves 32*a*, that is, so as to have trapezoidal cross sections in planes that are perpendicular to the thickness direction, and so as to have similar thicknesses to those of the first magnet holders 30, and upper and lower surfaces (outer circumferential surfaces and inner circumferential surfaces) of the first permanent magnets 33 are parallel flat surfaces. The first permanent magnets 33 are covered by first magnet covers 34 that are made of a nonmagnetic material such as a stainless alloy, or a synthetic resin, etc., for example, and are press-fitted into the first interfitting grooves 32*a* such their thickness directions are oriented in the thickness direction of the first magnet holders 30, and first end surfaces in the thickness direction of the first permanent magnets 33 and first end surfaces in the thickness direction of the first magnet holders 30 are positioned in a common plane, and are fitted into and held by the first magnet holders 30, an adhesive being applied if necessary.

Second magnet holders 35 have: second interfitting portions 36; and second magnet holding portions 37 that are formed integrally on upper portions of the second interfitting portions 36 are prepared so as to have a similar shape to the first magnet holders 30 using a similar material. Second permanent magnets 38 are prepared into similar shapes as the first permanent magnets 33 using an similar material. The second permanent magnets 38 are covered by second magnet covers 39 that are made of a nonmagnetic material such as a stainless alloy, or a synthetic resin, etc., for example, and are press-fitted into the second interfitting grooves 37*a* such their thickness directions are oriented in the thickness direction of the second magnet holders 35, and first end surfaces in the thickness direction of the second permanent magnets 38 and first end surfaces in the thickness direction of the second magnet holders 35 are positioned in a common plane, and are fitted into and held by the second magnet holders 35, an adhesive being applied if necessary.

The first magnet holders 30 are mounted to the first pole core body 17 by press-fitting the first interfitting protruding portions 31*a* into the facing first holding grooves 27 from the second axial end with the first permanent magnets 33 oriented upward so as to be magnetically connected when disposed so as to span each of the first trough portions 25, an adhesive being applied if necessary. At that point, the thickness directions of the first magnet holders 30 and the first permanent magnets 33 are oriented in the axial direction. Axial positions of the first magnet holders 30 are determined by the end surfaces of the first interfitting protruding portions 31*a* coming into contact with the first stopping surfaces 27*a*. When viewed from a radial direction, the first permanent magnets 33 are positioned entirely radially inside the second claw-shaped magnetic pole portions 24. The upper surfaces of the first permanent magnets 33 that are covered by the first magnet covers 34 face inner circumferential surfaces near the tip ends of the second claw-shaped magnetic pole portions 24 so as to leave a predetermined clearance.

The second magnet holders 35 are similarly mounted to the second pole core body 21 by press-fitting the second interfitting protruding portions 36*a* into the facing second holding grooves 28 from the first axial end with the second permanent magnets 38 oriented upward so as to be magnetically connected when disposed so as to span each of the second trough portions 26, an adhesive being applied if necessary. At that point, the thickness directions of the second magnet holders 35 and the second permanent magnets 38 are oriented in the axial direction. Axial positions of the second magnet holders 35 are determined by the end surfaces of the second interfitting protruding portions 36*a* coming into contact with the second stopping surfaces 28*a*. When viewed from a radial direction, the second permanent magnets 38 are positioned entirely radially inside the first claw-shaped magnetic pole portions 20. The upper surfaces of the second permanent magnets 38 that are covered by the second magnet covers 39 face inner circumferential surfaces near the tip ends of the first claw-shaped magnetic pole portions 20 so as to leave a predetermined clearance.

The first and second permanent magnets 33 and 38 are magnetically oriented in directions of magnetization 40 that are opposite to the orientation of a magnetic field 41 that the field current that flows through the field coil 14 produces in a plane that is perpendicular to a central axis of the rotor 13. In other words, if the magnetic field 41 is generated in the direction of the arrow shown in FIG. 1 when an electric current is passed through the field coil 14, the first and second permanent magnets 33 and 38 are magnetically oriented in a reverse direction to the magnetic field 41. Here, the directions of magnetization 40 of the first and second permanent magnets 33 and 38 may be oriented radially, and extensions of the directions of magnetization 40 are directed at inner circumferential surfaces near the tip ends of the facing first and second claw-shaped magnetic pole portions 20 and 24. Moreover, in the case of a design in which the orientation of the magnetic field 41 that the field current that flows through the field coil 14 produces is inverted, the first and second permanent magnets 33 and 38 will also be magnetically oriented in a reverse direction.

Next, operation of an automotive alternator 1 that has been configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Magnetic flux that has been generated when the current is passed through the field coil 14 enters tooth portions of the stator core 11 by passing through the air gap 29 from the first claw-shaped magnetic pole portions 20. The magnetic flux that has entered the stator core 11 then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux that has entered the second claw-shaped magnetic pole portions 24 passes through the second yoke portion 23, the second boss portion 22, the first boss portion 18, and the first yoke portion 19, and reaches the first claw-shaped magnetic pole portions 20.

The first and second permanent magnets 33 and 38 are magnetically oriented so as to be opposite to the orientation of the magnetic field 41 that is generated by the field coil 14. Thus, magnetic flux that originates from the first permanent magnets 33 enters the first magnet holders 30. Here, the first trough portions 25, i.e., large spaces, are present below the first magnet holders 30. Thus, the magnetic flux that has entered the first magnet holders 30 flows through the first interfitting portions 31 of the first magnet holders 30 in two circumferential directions and enters the first yoke portion 19, passes through the first boss portion 18, the second boss portion 22, the second yoke portion 23, and the second claw-shaped magnetic pole portions 24, and returns to the first permanent magnets 33 across an air gap. The magnetic flux that originates from the second permanent magnets 38 enters the first claw-shaped magnetic pole portions 20 across the air gap, passes through the first yoke portion 19, the first boss portion 18, and the second boss portion 22, and enters the second yoke portion 23. The magnetic flux that has entered the second yoke portion 23 flows radially outward through two sides of the second trough portions 26 of the second yoke portion 23, enters the second magnet holders 35 from two circumferential sides of the second magnet holders 35, and returns to the second permanent magnets 38.

Thus, the magnetic flux that originates from the first and second permanent magnets 33 and 38 is in a reverse direction from the magnetic flux that originates from the field coil 14, enabling the magnetic flux density of the magnetic bodies that constitute the first and second pole core bodies 17 and 21 to be reduced significantly. Magnetic saturation by the magnetic field that originates from the field coil 14 is relieved, increasing the magnetic flux that interacts with the stator 10, and enabling generated power to be increased.

Because the first and second permanent magnets 33 and 38 are disposed so as to face the inner circumferential surfaces near the tip ends of the second and first claw-shaped magnetic pole portions 24 and 20, the magnetic circuits of the first and second permanent magnets 33 and 38 are closed magnetic circuits inside the rotor 13. Thus, magnetic flux components that interlink with the stator core 11 among the magnetic flux that originates from the first and second permanent magnets 33 and 38 (leakage flux) are reduced. As a result, the occurrence of voltages induced by the first and second permanent magnets 33 and 38 during no-load de-energization is suppressed.

Because the first and second permanent magnets 33 and 38 are positioned radially inside the outermost circumferential surface of the rotor 13, and are not exposed from the second and first claw-shaped magnetic pole portions 24 and 20 when viewed from radially outside, stator slot harmonics are confined to outermost circumferential portions of the first and second claw-shaped magnetic pole portions 20 and 24, and do not act to heat the first and second permanent magnets 33 and 38 by direct induction. As a result, the first and second permanent magnets 33 and 38 can be prevented from being heated and thermally demagnetized.

Because the first and second permanent magnets 33 and 38 are covered by the first and second magnet covers 34 and 39, the first and second claw-shaped magnetic pole portions 20 and 24, which vibrate during high-speed rotation of the rotor 13, or airborne foreign matter, etc., will not contact the first and second permanent magnets 33 and 38 directly, suppressing occurrences of damage to the first and second permanent magnets 33 and 38. Even if the first and second permanent magnets 33 and 38 are damaged, scattering of fragments of the first and second permanent magnets 33 and 38 will be suppressed.

According to Embodiment 1, because the first and second holding grooves 27 and 28 have groove directions oriented in an axial direction, and are formed so as to have openings on axially inner sides, the first and second magnet holders 30 and 35 can be fitted into and held by the first and second pole core bodies 17 and 21 so as to restrict circumferential and radial motion thereof by press-fitting the first and second interfitting protruding portions 31a and 36a into the first and second holding grooves 27 and 28 from axially inside. In addition, because the first and second holding grooves 27 and 28 are formed so as to be closed axially outward, the first and second magnet holders 30 and 35 can be held in the first and second pole core bodies 17 and 21 such that axially outward movement thereof is restricted by inserting the first and second interfitting protruding portions 31a and 36a into the first and second holding grooves 27 and 28 until the end surfaces of the first and second interfitting portions 31 and 36 come into contact with the first and second stopping surfaces 27a and 28a of the first and second holding grooves 27 and 28.

Mounting of the first and second magnet holders 30 and 35 onto the first and second pole core bodies 17 and 21 is thereby facilitated. Axial positions of the first and second magnet holders 30 and 35 can also be positioned simply at that point.

Because first and second interfitting grooves 32a and 37a are formed so as to have openings on upper surfaces of the first and second magnet holding portions 32 and 37 so as to have groove directions in a thickness direction and so as to pass through in the thickness direction, the first and second permanent magnets 33 and 38 can be fitted into and held by the first and second magnet holders 30 and 35 so as to restrict width direction and vertical movement thereof by press-fitting the first and second permanent magnets 33 and 38 into the first and second interfitting grooves 32a and 37a from the thickness direction. Thus, mounting of the first and second permanent magnets 33 and 38 to the first and second magnet holders 30 and 35 is facilitated. The first and second permanent magnets 33 and 38 can thereby be mounted to the first and second pole core bodies 17 and 21 after being mounted to the first and second magnet holders 30 and 35. Thus, mountability of the first and second permanent magnets 33 and 38 onto the first and second pole core bodies 17 and 21 is improved.

Because the first and second permanent magnets 33 and 38 are mounted to the first and second yoke portions 19 and 23 by means of the first and second magnet holders 30 and 35, displacement of the first and second claw-shaped magnetic pole portions 20 and 24 due to centrifugal forces will not act on the holding construction for the first and second permanent magnets 33 and 38. Because the first and second permanent magnets 33 and 38 are positioned radially inside tip end portions of the second and first claw-shaped magnetic pole portions 24 and 20, centrifugal forces that act on the first and second permanent magnets 33 and 38 are reduced. Long-term, stable holding of the first and second permanent magnets 33 and 38 is thereby achieved.

The first and second permanent magnets 33 and 38 are fitted together with the first and second interfitting grooves 32a and 37a and held by the first and second magnet holders 30 and 35. Thus, centrifugal forces that act on the first and second permanent magnets 33 and 38 are borne by the interfitting surfaces of the first and second interfitting grooves 32a and 37a into which the first and second permanent magnets 33 and 38 are fitted. Concentration of stresses due to centrifugal forces is thereby alleviated, suppressing occurrences of damage to the first and second permanent magnets 33 and 38.

The first and second magnet holders 30 and 35 are fitted together with the first and second holding grooves 27 and 28 and held by the first and second pole core bodies 17 and 21. Thus, centrifugal forces that act on the first and second permanent magnets 33 and 38 and the first and second magnet holders 30 and 35 are borne by the interfitting surfaces of the first and second holding grooves 27 and 28 into which the first and second magnet holders 30 and 35 are fitted. Concentration of stresses due to centrifugal forces is thereby alleviated, suppressing occurrences of damage at the interfitting portions between the first and second magnet holders 30 and 35 and the first and second pole core bodies 17 and 21.

Figure 7:
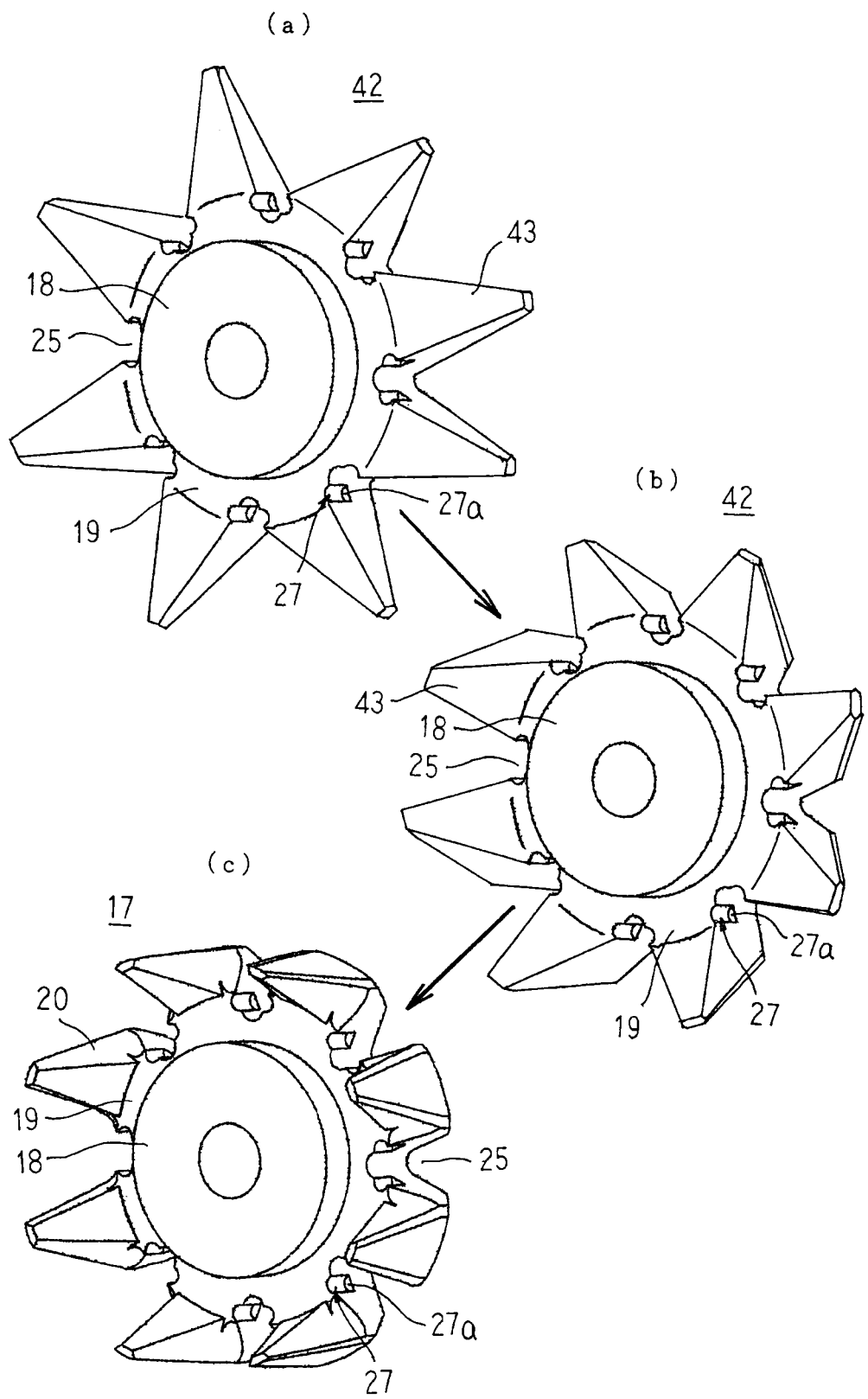
FIG. 7 is a diagram that explains a method for manufacturing a pole core body that constitutes the rotor that can be used in the automotive alternator according to Embodiment 1 of the present invention.

A method for manufacturing the first pole core body 17 by a cold forging method will now be explained with reference to FIG. 7.

First, a core body 42 is compression-molded from a metal blank at room temperature using a die. As shown in FIG. 7(a), this core body 42 has: a cylindrical first boss portion 18; a thick ring-shaped first yoke portion 19 that extends radially outward from the first axial end of the first boss portion 18; portions that correspond to first claw-shaped magnetic pole portions 43 that extend radially outward from the first yoke portion 19; first trough portions 25 that have been recessed between adjacent portions that correspond to first claw-shaped magnetic pole portions 43 of the first yoke portion 19; and first holding grooves 27 that are recessed to a predetermined groove length from a second end of the first yoke portion 19 toward a first end near root ends of the portions that correspond to first claw-shaped magnetic pole portions 43 so as to have openings on respective facing portions on radially outer portions of inner wall surfaces of the first trough portions 25 and so as to have a groove direction oriented in an axial direction.

Next, as shown in FIG. 7(b), the portions that correspond to first claw-shaped magnetic pole portions 43 that extend radially outward from the first yoke portion 19 are bent approximately at right angles. Here, although not shown, deformation of the groove shapes of the holding grooves 27 can be suppressed by bending the portions that correspond to first claw-shaped magnetic pole portions 43 approximately at right angles with rod-shaped jigs that have been prepared so as to have shapes that conform to the groove shapes of the holding grooves 27 inserted into each of the holding grooves 27, for example. As shown in FIG. 7(c), a first pole core body 17 is thereby prepared in which the first claw-shaped magnetic pole portions 20 extend outward from the first yoke portion 19 toward a second axial end.

Here, chamfers have been formed on two sides of approximately trapezoidal radially-outermost surfaces of the portions that correspond to first claw-shaped magnetic pole portions 43 of the core body 42 that face each other circumferentially, but chamfers may also be formed by a cutting process after the portions that correspond to first claw-shaped magnetic pole portions 43 have been bent.

Moreover, the second pole core body 21 is also prepared in a similar manner.

In Embodiment 1, because the first and second trough portions 25 and 26 are formed integrally on the core body 42, which is compression-molded by a cold forging method, the first and second portions that correspond to claw-shaped magnetic pole portions 43 are more easily bent approximately at right angles, enabling yield in the bending process of the first and second portions that correspond to claw-shaped magnetic pole portions 43 to be increased.

Because the first and second holding grooves 27 and 28 are formed simultaneously during the compression molding of the core body 42, it is not necessary to prepare the first and second holding grooves 27 and 28 by after-processing, enabling the first and second pole core bodies 17 and 21 to be prepared inexpensively.

Moreover, in Embodiment 1 above, first and second magnet holders are prepared using solid bodies of magnetic material, but first and second magnet holders may also be prepared by laminating and integrating thin plates of magnetic material that have been punched into desired shapes.

Embodiment 2

Figure 8:
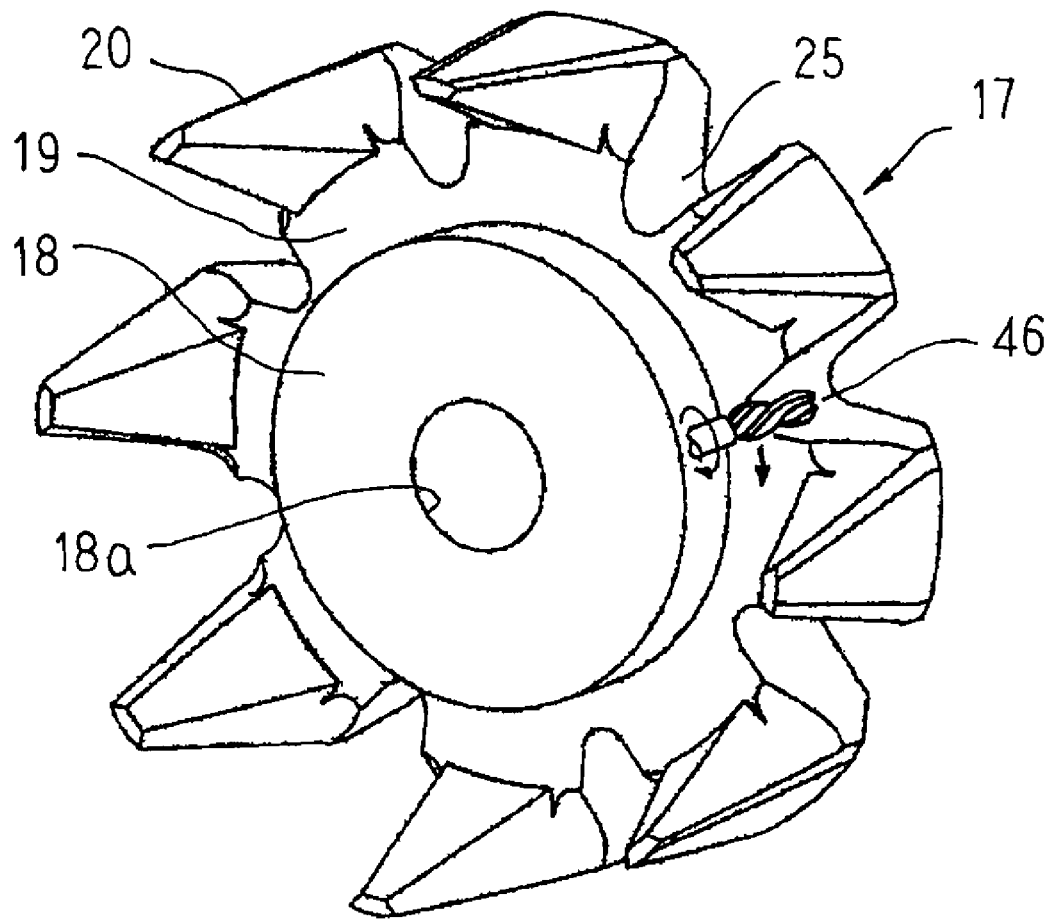
FIG. 8 is a perspective that explains a method for machining holding grooves into a pole core body that constitutes a rotor that can be used in an automotive alternator according to Embodiment 2 of the present invention.

In Embodiment 2, although not shown, a first pole core body 17 is first prepared by bending portions that correspond to first claw-shaped magnetic pole portions 43. Here, first trough portions 25 are also formed simultaneously. Next, as shown in FIG. 8, first holding grooves are formed by rotating and pushing an end mill 46 against inner wall surfaces of first trough portions 25 of the first pole core body 17 from a circumferential direction. Moreover, second holding grooves 28 are also formed in a similar manner.

According to Embodiment 2, because the first and second holding grooves 27 and 28 are formed by a cutting process, processing precision of the first and second holding grooves 27 and 28 can be increased compared to Embodiment 1 above in which the first and second holding grooves 27 and 28 are formed by a cold forging method.

Moreover, in Embodiment 2 above, the first and second holding grooves are formed by a cutting process that uses an end mill, but the method of forming the first and second holding grooves is not limited to a cutting process that uses an end mill, and may also be, for example, a cutting process that uses a drill such as boring, dowel drilling, etc.

In Embodiment 2 above, the first and second trough portions are formed together with the core body by a cold forging method, but the first and second trough portions may also be formed together with the first and second holding grooves by cutting using an end mill or drill after the portions that correspond to the first and second claw-shaped magnetic pole portions are bent approximately at right angles to form the first and second claw-shaped magnetic pole portions.

Embodiment 3

Figure 9:
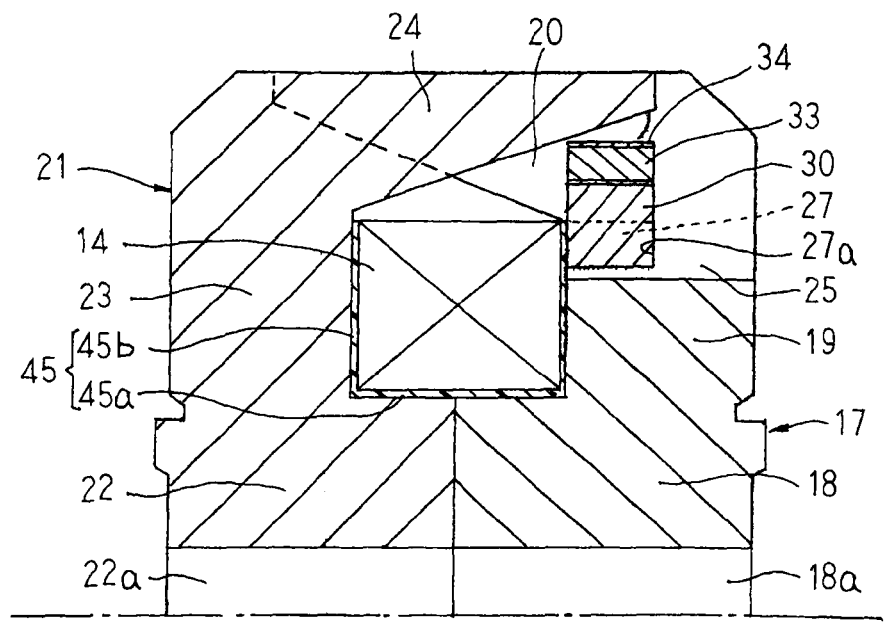
FIG. 9 is a cross section that shows a rotor that can be used in an automotive alternator according to Embodiment 3 of the present invention.

FIG. 9 is a cross section that shows a rotor that can be used in an automotive alternator according to Embodiment 3 of the present invention.

In FIG. 9, axially inner end surfaces of first magnet holders 30 come into contact with a flange portion 45b of a bobbin 45 to restrict axially inward movement of the first magnet holders 30. Although not shown, axially inner end surfaces of second magnet holders 35 come into contact with a flange portion 45b of the bobbin 45 in a similar manner to restrict axially inward movement of the second magnet holders 35.

Moreover, the rest of the configuration is configured in a similar manner to Embodiment 1 above.

According to Embodiment 3, axial movement of the first and second magnet holders 30 and 35 is restricted by the first and second stopping surfaces 27a and 28a of the first and second holding grooves 27 and 28 and the flange portions 45b of the bobbin 45, enabling the first and second magnet holders 30 and 35 to be held stably.

Because the bobbin 45 is made of a resin, even if axially inner end surface shapes of the first and second magnet holders 30 and 35 are changed, shapes of the flange portions 45b can be modified easily so as to conform to the axially inner end surface shapes of the first and second magnet holders 30 and 35.

Embodiment 4

Figure 10:
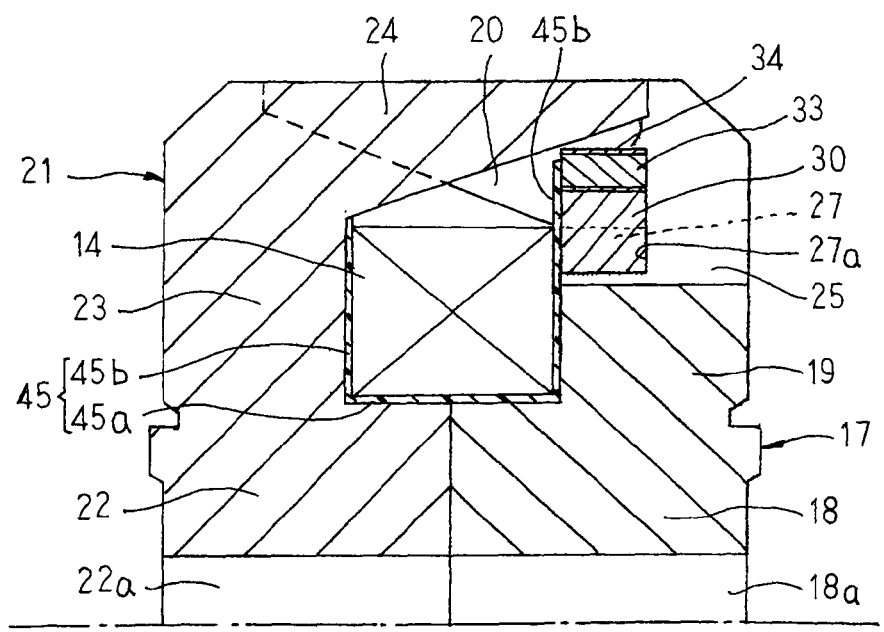
FIG. 10 is a cross section that shows a rotor that can be used in an automotive alternator according to Embodiment 4 of the present invention.

FIG. 10 is a cross section that shows a rotor that can be used in an automotive alternator according to Embodiment 4 of the present invention.

In FIG. 10, axially inner end surfaces of first magnet holders 30 and first permanent magnets 33 come into contact with a flange portion 45b of a bobbin 45 to restrict axially inward movement of the first magnet holders 30 and the first permanent magnets 33. Although not shown, axially inner end surfaces of second magnet holders 35 and second permanent magnets 38 come into contact with a flange portion 45b of the bobbin 45 in a similar manner to restrict axially inward movement of the second magnet holders 35 and the second permanent magnets 38.

Moreover, the rest of the configuration is configured in a similar manner to Embodiment 1 above.

According to Embodiment 4, axial movement of the first and second magnet holders 30 and 35 is restricted by the first and second stopping surfaces 27a and 28a of the first and second holding grooves 27 and 28 and the flange portions 45b of the bobbin 45, enabling the first and second magnet holders 30 and 35 to be held stably. In addition, axially inward movement of the first and second permanent magnets 33 and 38 is restricted by the flange portions 45b of the bobbin 45, enabling the first and second permanent magnets 33 and 38 to be held stably.

Embodiment 5

Figure 11:
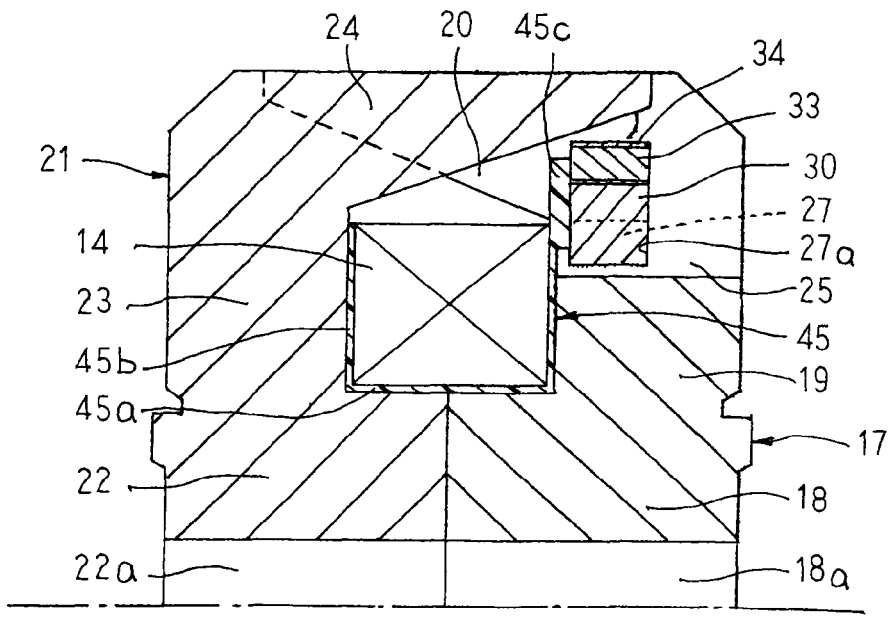
FIG. 11 is a cross section that shows a rotor that can be used in an automotive alternator according to Embodiment 5 of the present invention.

FIG. 11 is a cross section that shows a rotor that can be used in an automotive alternator according to Embodiment 5 of the present invention.

In FIG. 11, thick portions 45c are formed on radially outer sides of flange portions 45b of a bobbin 45. Axially inner end surfaces of first magnet holders 30 and first permanent magnets 33 come into contact with the thick portions 45c to restrict axially inward movement of the first magnet holders 30 and the first permanent magnets 33. Although not shown, axially inner end surfaces of second magnet holders 35 and second permanent magnets 38 come into contact with the thick portions 45c in a similar manner to restrict axially inward movement of the second magnet holders 35 and the second permanent magnets 38.

Moreover, the rest of the configuration is configured in a similar manner to Embodiment 1 above.

According to Embodiment 5, thick portions 45c that are formed on radially outer sides of the flange portions 45b of the bobbin 45 come into contact with the axially inner end surfaces of the first and second magnet holders 30 and 35 and the first and second permanent magnets 33 and 38. Thus, axial movement of the first and second magnet holders 30 and 35 can be reliably prevented. Axially inward movement of the first and second permanent magnets 33 and 38 can also be reliably prevented.

Embodiment 6

Figure 12:
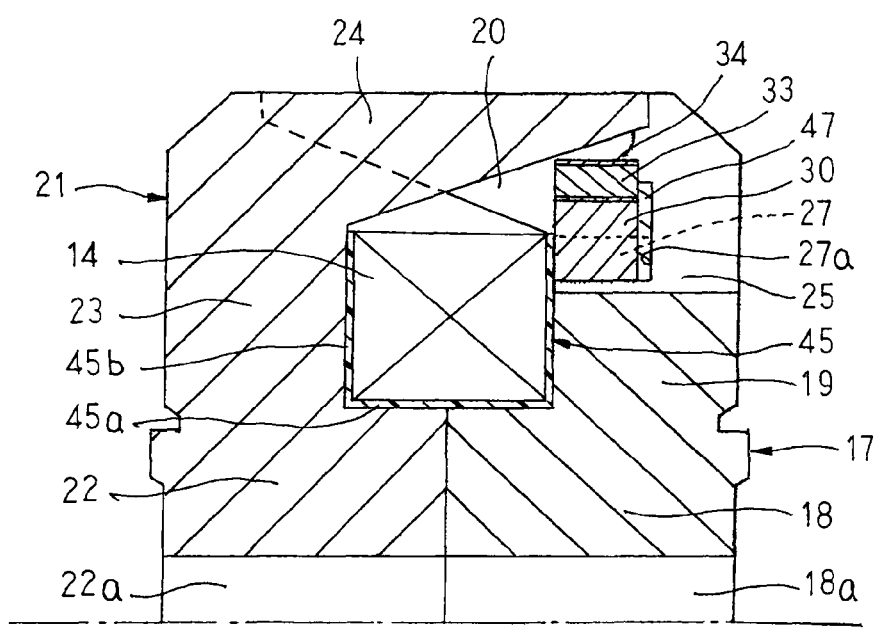
FIG. 12 is a cross section that shows a rotor that can be used in an automotive alternator according to Embodiment 6 of the present invention.
Figure 13:
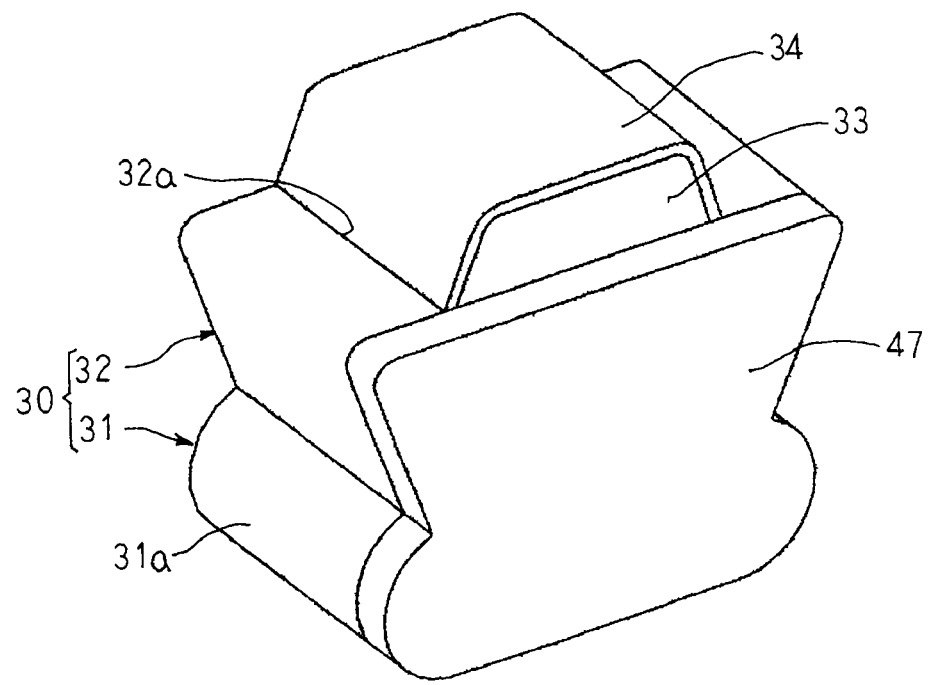
FIG. 13 is a perspective that shows a state in which a permanent magnet is mounted to a magnet holder in the automotive alternator according to Embodiment 6 of the present invention.

FIG. 12 is a cross section that shows a rotor that can be used in an automotive alternator according to Embodiment 6 of the present invention, and FIG. 13 is a perspective that shows a state in which a permanent magnet is mounted to a magnet holder in the automotive alternator according to Embodiment 6 of the present invention.

In FIGS. 12 and 13, first spacers 47 are fitted into first holding grooves 27 so as to be held between axially outer end surfaces of first magnet holders 30 and first stopping surfaces 27a of the first holding grooves 27. The axially outer end surfaces of the first magnet holders 30 and the first permanent magnets 33 come into contact with the first spacers 47. Although not shown, first spacers 47 are similarly fitted into second holding grooves 28 so as to be held between axially outer end surfaces of second magnet holders 35 and second stopping surfaces 28a of the second holding grooves 28. The axially outer end surfaces of the second magnet holders 35 and the second permanent magnets 38 come into contact with the first spacers 47.

Moreover, the rest of the configuration is configured in a similar manner to Embodiment 4 above.

According to Embodiment 6, axial movement of the first and second magnet holders 30 and 35 can be reliably prevented, and axial movement of the first and second permanent magnets 33 and 38 can also be reliably prevented.

Because first spacers 47 are held between the first and second magnet holders 30 and 35 and the first and second stopping surfaces 27a and 28a, axial positions of the first and second magnet holders 30 and 35 can be reliably positioned even if the groove length of the first and second holding grooves 27 and 28 is longer than the thickness of the first and second magnet holders 30 and 35.

Here, if the first spacers 47 are configured by stacking thin plates, axial positioning of the first and second magnet holders 30 and 35 can be simplified by adjusting the number of stacked plates.

Embodiment 7

Figure 14:
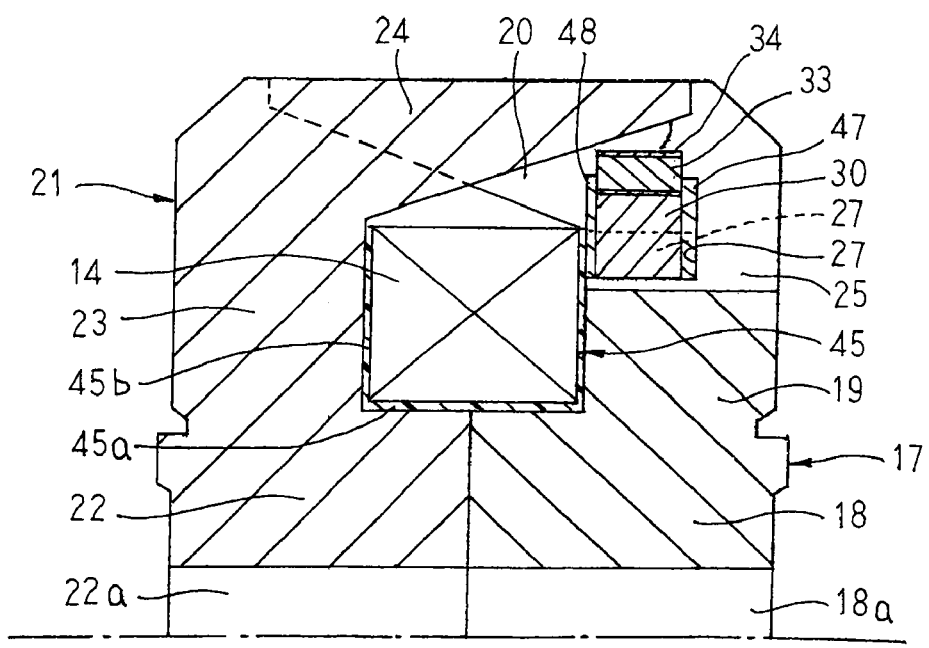
FIG. 14 is a cross section that shows a rotor that can be used in an automotive alternator according to Embodiment 7 of the present invention.

FIG. 14 is a cross section that shows a rotor that can be used in an automotive alternator according to Embodiment 7 of the present invention.

In FIG. 14, second spacers 48 are fitted into first holding grooves 27 so as to be held between axially inner end surfaces of first magnet holders 30 and a flange portion 45b of a bobbin 45. Axially inner end surfaces of the first magnet holders 30 and first permanent magnets 33 come into contact with the second spacers 48. Although not shown, second spacers 48 are similarly fitted into second holding grooves 28 so as to be held between axially inner end surfaces of second magnet holders 35 and a flange portion 45b of the bobbin 45. Axially inner end surfaces of the second magnet holders 35 and the second permanent magnets 38 come into contact with the second spacers 48.

Moreover, the rest of the configuration is configured in a similar manner to Embodiment 6 above.

According to Embodiment 7, gaps between the axially inner end surfaces of the first and second magnet holders 30 and 35 and the first and second permanent magnets 33 and 38 and the flange portions 45b of the bobbin 45 can be reliably eliminated, enabling axial movement of the first and second magnet holders 30 and 35 and the first and second permanent magnets 33 and 38 to be reliably prevented.

Here, if the second spacers 48 are configured by stacking thin plates, gaps between the axially inner end surfaces of the first and second magnet holders 30 and 35 and the first and second permanent magnets 33 and 38 and the flange portion 45b of the bobbin 45 can be eliminated easily by adjusting the number of stacked plates.

Moreover, in Embodiments 6 and 7 above, if the first and second spacers are prepared using magnetic bodies, it is desirable for the first and second spacers to be disposed so as to come into contact with radially inner sides of the axial end surfaces of the first and second permanent magnets. In other words, if the first and second spacers are placed in contact with radially outer sides of the axial end surfaces of the first and second permanent magnets, magnetic flux from the permanent magnets is more likely to flow into the first and second spacers. As a result, magnetic leakage flux is increased, reducing output improving effects from the permanent magnets.

Moreover, in Embodiments 1 through 7 above, first and second permanent magnets 33 and 38 are disposed in all of the first and second trough portions 25 and 26, but the number of first and second permanent magnets 33 and 38 disposed can be set appropriately so as to take into account required specifications and costs. A case in which the number of first and second permanent magnets 33 and 38 disposed is four will now be explained.

Embodiment 8

Figure 15:
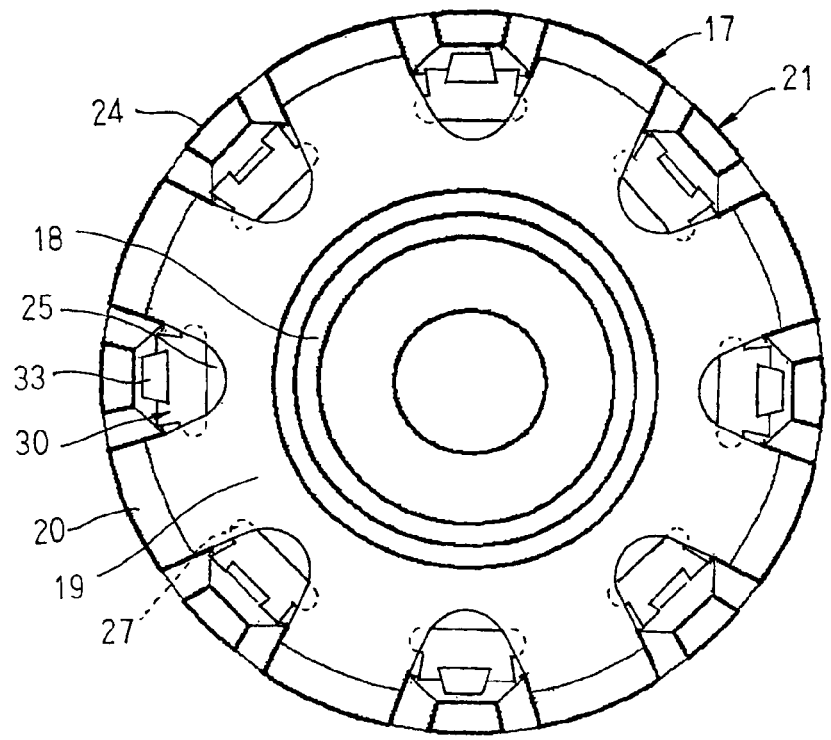
FIG. 15 is an end elevation of a rotor that can be used in an automotive alternator according to Embodiment 8 of the present invention viewed from a front end.

In Embodiment 8, as shown in FIG. 15, first and second magnet holders 30 and 35 are disposed so as to span all of the first and second trough portions 25 and 26, and four first and second permanent magnets 33 and 38 are respectively mounted into circumferentially alternate first and second magnet holders 30 and 35.

Moreover, the rest of the configuration is configured in a similar manner to Embodiment 1 above.

In Embodiment 8, because the first and second permanent magnets 33 and 38 are disposed at a uniform angular pitch circumferentially, generation of gravimetric and magnetic imbalances that result from disposing the first and second permanent magnets 33 and 38 is suppressed.

Embodiment 9

Figure 16:
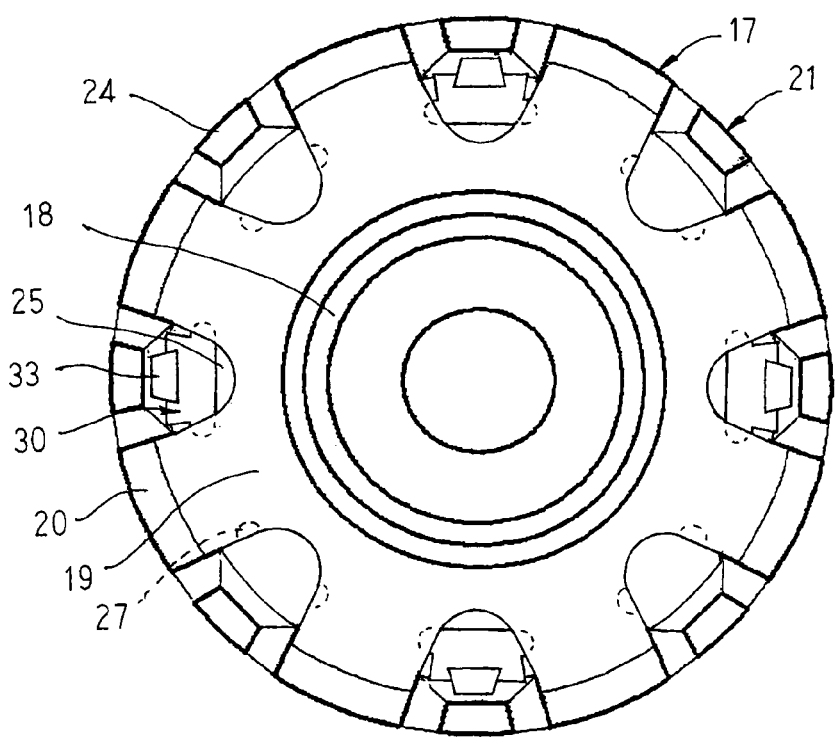
FIG. 16 is an end elevation of a rotor that can be used in an automotive alternator according to Embodiment 9 of the present invention viewed from a front end.

In Embodiment 9, as shown in FIG. 16, first and second magnet holders 30 and 35 are respectively disposed so as to span circumferentially alternate first and second trough portions 25 and 26, and first and second permanent magnets 33 and 38 are mounted into each of the first and second magnet holders 30 and 35.

Moreover, the rest of the configuration is configured in a similar manner to Embodiment 1 above.

In Embodiment 9, because the first and second magnet holders 30 and 35 into which the first and second permanent magnets 33 and 38 have been mounted are disposed at a uniform angular pitch circumferentially, generation of gravimetric and magnetic imbalances that result from disposing the first and second permanent magnets 33 and 38 is suppressed.

Because the first and second magnet holders 30 and 35 are not disposed so as to span the first and second trough portions 25 and 26 in which the first and second permanent magnets 33 and 38 are not disposed, cost reductions are enabled, and installation work for the first and second magnet holders 30 and 35 is also reduced, improving rotor assembly.

Moreover, in each of the above embodiments, explanations are given for automotive alternators, but the present invention is not limited to automotive alternators, and similar effects are also exhibited if the present invention is applied to dynamoelectric machines such as automotive electric motors, automotive generator-motors, etc.

In each of the above embodiments, a pole core is constituted by two pole core bodies that have been divided at a axially central position of a boss portion, but the axial dividing position of the pole core is not limited to an axially central position of the boss portion, and a division may also be made at an axially inner end surface position of one of the yoke portions, for example. In addition, the number of divisions of the pole core is not limited to two, and may also be three, for example. In that case, the pole core may also be configured by three pole core bodies that are divided at axially inner end surface positions of the pair of yoke portions.

What is claimed is:

1. A dynamoelectric machine comprising:
a rotor comprising:
a pole core comprising:
a boss portion;
a pair of yoke portions that are disposed so as to extend radially outward from two axial end edge portions of said boss portion; and
a plurality of claw-shaped magnetic pole portions that are disposed so as to extend in an axial direction alternately from each of said pair of yoke portions, and that are arranged circumferentially so as to intermesh with each other,
a trough portion that curves radially inward being formed on a portion of each of said yoke portions between circumferentially adjacent claw-shaped magnetic pole portions, and said pole core being fixed to a rotating shaft that is inserted through a central axial position of said boss portion; and
a field coil that is wound onto a bobbin, and that is housed inside a space that is surrounded by said boss portion, said pair of yoke portions, and said plurality of claw-shaped magnetic pole portions; and
a stator that is disposed so as to surround an outer circumference of said rotor so as to have a predetermined air gap interposed,
said dynamoelectric machine comprising:
holding grooves that are recessed into said yoke portions in a non-piercing state so as to have openings on respective facing portions of inner wall surfaces of said trough portions, so as to have openings at axially inner ends of said yoke portions, and so as to have groove directions in an axial direction, and in which an end surface in a groove length direction constitutes a stopping surface;
magnet holders that are made of a magnetic material that are disposed so as to span said trough portions radially inside inner circumferential surfaces near tip ends of said claw-shaped magnetic pole portions by being fitted from axially inside into each of said holding grooves that are recessed so as to face each other on said trough portions such that circumferential and radial motion is restricted by inner wall surfaces of said holding grooves and axially outward movement is restricted by said stopping surface, and in which interfitting grooves are formed so as to have openings on surfaces that face said inner circumferential surfaces near said tip ends of said claw-shaped magnetic pole portions, so as to have groove directions in an axial direction, and so as to pass through in said axial direction; and
permanent magnets that are fitted into said interfitting grooves and are held by said magnet holders so as to face said inner circumferential surfaces near said tip ends of said claw-shaped magnetic pole portions.

2. A dynamoelectric machine according to claim 1, wherein a flange portion of said bobbin contacts an axially inner end portion of said magnet holders.

3. A dynamoelectric machine according to claim 2, wherein a second spacer is interposed between said flange portions and an axially inner end portion of said magnet holders.

4. A dynamoelectric machine according to claim 2, wherein a first spacer is interposed between an axially outer end portion of said magnet holders and said stopping surface.

5. A dynamoelectric machine according to claim 4, wherein a second spacer is interposed between said flange portions and an axially inner end portion of said magnet holders.

6. A dynamoelectric machine according to claim 4, wherein said first spacer contacts an axially outer end portion of said permanent magnets.

7. A dynamoelectric machine according to claim 6, wherein a second spacer is interposed between said flange portions and an axially inner end portion of said magnet holders.

8. A dynamoelectric machine according to claim 2, wherein said flange portion contacts an axially inner end portion of said permanent magnets.

9. A dynamoelectric machine according to claim 8, wherein a second spacer is interposed between said flange portions and an axially inner end portion of said magnet holders.

10. A dynamoelectric machine according to claim 8, wherein a first spacer is interposed between an axially outer end portion of said magnet holders and said stopping surface.

11. A dynamoelectric machine according to claim 10, wherein a second spacer is interposed between said flange portions and an axially inner end portion of said magnet holders.

12. A dynamoelectric machine according to claim 10, wherein said first spacer contacts an axially outer end portion of said permanent magnets.

13. A dynamoelectric machine according to claim 12, wherein a second spacer is interposed between said flange portions and an axially inner end portion of said magnet holders.

* * * * *